US010363810B2

(12) United States Patent
Blackford et al.

(10) Patent No.: US 10,363,810 B2
(45) Date of Patent: Jul. 30, 2019

(54) AIR INTAKE GRILLE ASSEMBLY, AND METHODS OF USE AND MANUFACTURE THEREOF

(71) Applicant: Honda Motor Co., Ltd., Tokyo (JP)

(72) Inventors: Zachary Roger Blackford, Roseau, MN (US); Pradyumna Srinivasan, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/460,619

(22) Filed: Mar. 16, 2017

(65) Prior Publication Data

US 2018/0264930 A1  Sep. 20, 2018

(51) Int. Cl.
| | |
|---|---|
| *B60K 11/00* | (2006.01) |
| *B60K 11/08* | (2006.01) |
| *B60K 11/06* | (2006.01) |
| *B60R 19/52* | (2006.01) |
| *F01P 11/10* | (2006.01) |

(52) U.S. Cl.
CPC .............. *B60K 11/08* (2013.01); *B60K 11/06* (2013.01); *B60R 19/52* (2013.01); *F01P 11/10* (2013.01)

(58) Field of Classification Search
CPC ....... B60K 11/085; B60K 11/08; B60K 11/04; B60K 11/06
See application file for complete search history.

(56) References Cited

U.S. PATENT DOCUMENTS

| | | | | |
|---|---|---|---|---|
| 4,406,489 | A * | 9/1983 | Trabert | B60R 19/52 293/115 |
| 4,566,407 | A * | 1/1986 | Peter | B60K 11/08 123/41.48 |
| 5,688,020 | A * | 11/1997 | Burg | B62D 33/0273 296/180.1 |
| 6,012,761 | A * | 1/2000 | Hellhake | B60K 11/08 293/115 |
| 6,405,819 | B1 | 6/2002 | Ohkura et al. | |
| 6,527,333 | B2 * | 3/2003 | Hewitt | B60K 11/08 180/68.6 |
| 6,932,413 | B2 * | 8/2005 | Lloyd | B60R 19/52 296/115 |
| 7,013,951 | B2 | 3/2006 | Bauer et al. | |
| 7,686,116 | B2 | 3/2010 | Oohashi et al. | |
| 7,717,208 | B2 * | 5/2010 | Knauer | B60K 11/085 180/68.1 |
| 7,766,111 | B2 * | 8/2010 | Guilfoyle | B60K 11/04 180/68.1 |

(Continued)

FOREIGN PATENT DOCUMENTS

| | | |
|---|---|---|
| DE | 3630646 C1 | 7/1987 |
| GB | 2131150 A | 6/1984 |
| JP | 5379407 B2 | 12/2013 |

*Primary Examiner* — Hau V Phan
(74) *Attorney, Agent, or Firm* — Kenealy Vaidya LLP

(57) ABSTRACT

Some embodiments are directed to an air intake grille assembly of a vehicle operable in forward and backward directions of travel across a surface. The air intake grille assembly can include a frame defining an opening. The air intake assembly can also include a plurality of louvers extending laterally across the opening, at least one of the plurality of louvers having a double curve shape defining first and second curve portions, wherein the first and second curve portions each have a different radius of curvature.

20 Claims, 3 Drawing Sheets

(56) References Cited

U.S. PATENT DOCUMENTS

| | | | |
|---|---|---|---|
| 8,128,153 B2 * | 3/2012 | Bernt | B60K 11/085 180/68.6 |
| 8,348,312 B2 | 1/2013 | Bailey | |
| 8,439,143 B2 | 5/2013 | Leanza et al. | |
| 8,469,128 B2 * | 6/2013 | Van Buren | B60K 11/085 165/44 |
| 8,485,296 B2 * | 7/2013 | Charnesky | B60K 11/085 165/98 |
| 9,586,625 B2 * | 3/2017 | Crane | B60K 11/085 |
| 2007/0169725 A1 * | 7/2007 | Harich | B60K 11/085 123/41.05 |
| 2016/0096428 A1 | 4/2016 | Vaishnav et al. | |

* cited by examiner

AIR INTAKE GRILLE ASSEMBLY, AND METHODS OF USE AND MANUFACTURE THEREOF

BACKGROUND

The disclosed subject matter relates to air intake grille assemblies, and methods of use and manufacture thereof. More particularly, the disclosed subject matter relates to methods and apparatus that guide air to a radiator while impeding debris from reaching the radiator.

Vehicle radiators, particularly radiators located in a front assembly of a vehicle, enhance vehicle performance by supplying the engine with coolants to maintain suitable operating temperatures. Radiator grilles are used to cover air inlets in the radiator, and these grilles can have louvers that guide air to the radiator as well as protect the radiator from debris. Orientation of the louvers can affect airflow currents and recirculation to increase airflow to the radiator to enhance operating efficiency.

SUMMARY

According to one aspect, an air intake grille assembly of a vehicle operable in forward and backward directions of travel across a surface can be provided. The air intake grille assembly can include a frame defining an opening. The air intake assembly can also include a plurality of louvers extending laterally across the opening, at least one of the plurality of louvers having a double curve shape defining first and second curve portions, wherein the first and second curve portions each have a different radius of curvature.

According to another aspect, a louver of a vehicle grille configured to facilitate air passing therethrough can be provided. The louver can include a laterally elongated body having a double curve shape defining first and second curve portions, wherein the first and second curve portions each have a different radius of curvature.

According to yet another aspect, a vehicle can be provided having a front assembly configured to direct air flow to a radiator. The vehicle can include a grille frame connected to the front assembly proximate the radiator, the grille frame defining an opening. The vehicle can also include a plurality of louvers extending laterally across the opening, at least one of the plurality of louvers having a double curve shape defining first and second curve portions, wherein the first and second curve portions each have a different radius of curvature.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
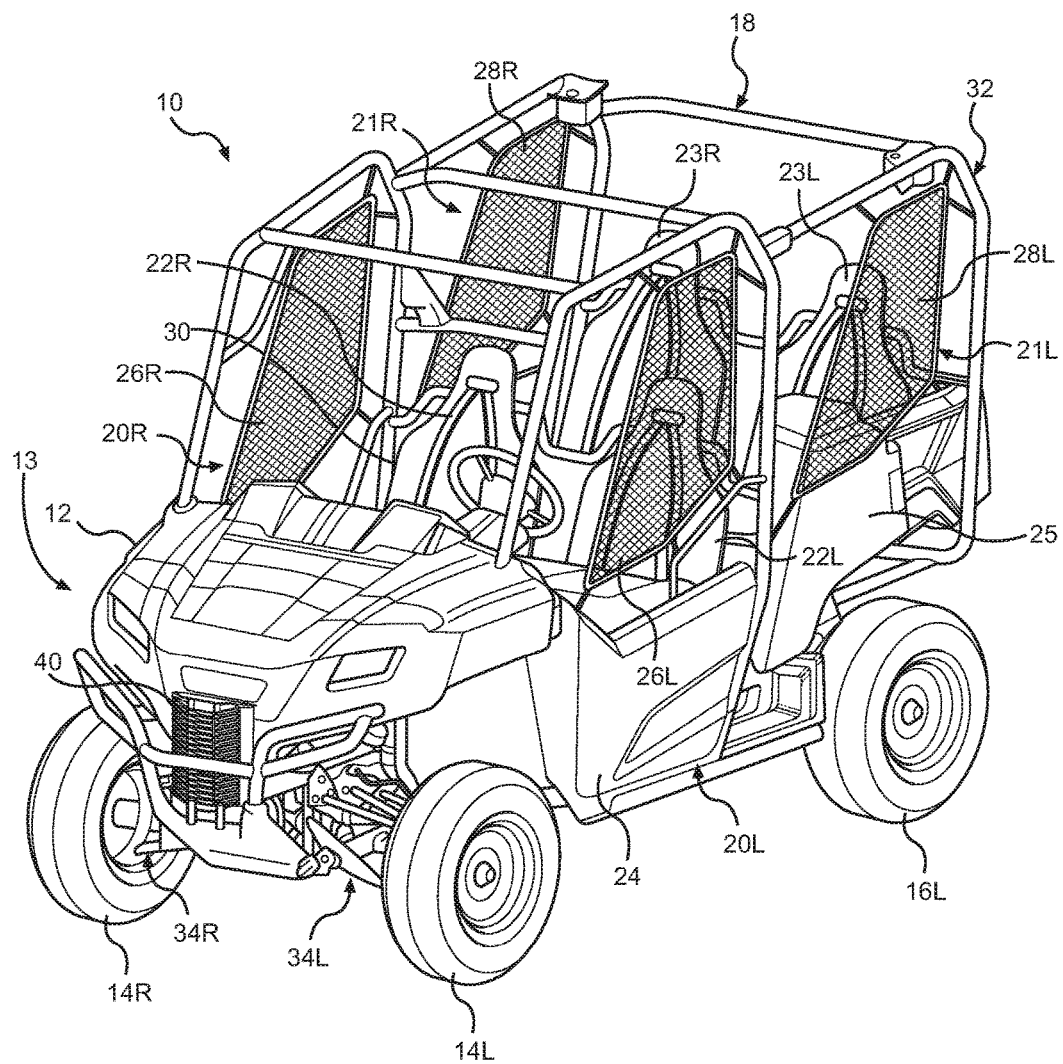
FIG. 1 is a perspective view of an exemplary vehicle including a front assembly in accordance with the disclosed subject matter.

FIG. 1 illustrates an embodiment of a vehicle 10 that can include a front assembly made in accordance with the principles of the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (S×S, or S×S ATV).

However, the disclosed air intake grille assembly can be used with any vehicle that is configured for travel along any one or combination of improved, unimproved, and unmarked paths. For example, embodiments are intended to include or otherwise cover any type of vehicle or automobile, including a passenger car, minivan, truck, other types of all-terrain vehicles (ATV), semi-tractor, off-highway vehicle, etc. In fact, embodiments are intended to include or otherwise cover configurations of the air intake grille assembly for use in still other types of vehicles, such as an autonomous wheeled vehicle, a non-motorized wheeled vehicle, a continuous tracked vehicle (such as but not limited to a military tank, bulldozer, and farm tractor), etc.

The vehicle 10 can include a body 12, a pair of front wheels, 14L, 14R, a pair of rear wheels 16L, 16R, a roll cage 18, a pair of front door assemblies 20L, 20R, a pair of rear door assemblies 21L, 21R, a frame assembly 32, a pair of front suspension assemblies 34L, 34R, a pair of rear suspension assemblies and a powertrain. The right rear wheel 16R, the rear suspension assemblies and the powertrain are hidden from view in FIG. 1 by the body 12. The frame assembly 32 can include the roll cage 18. As will be discussed in detail below, the body 12 can be configured to include a front assembly 13 to house systems related to engine operation such as a radiator. Thus, a location of the radiator at a front of the vehicle 10 in a forward direction of travel can enable airflow to be guided to the radiator through a grille. The grille can additionally protect the radiator from debris.

The vehicle 10 can include a pair of front seats 22L, 22R and a pair of rear seats 23L, 23R mounted in a passenger area of the vehicle 10. The roll cage 18 can be configured to extend around and above the seats 22L, 22R, 23L, 23R and the passenger area. The roll cage 18 can cooperate with the body 12 and/or at least a portion of the frame assembly 32 to define a pair of door openings through which a passenger may pass in order to enter or exit the passenger area. In other embodiments the vehicle 10 can include one pair of seats or just a single seat mounted in the passenger area. In those embodiments, the roll cage 18 can cooperate with the body 12 and/or at least a portion of the frame assembly 32 to define a single pair of door openings either side the seat(s).

The front door assemblies 20L, 20R can each include a door 24 and a front window panel assembly 26L, 26R, and can be configured to selectively open and close access through the door openings by moving between a closed position and a fully opened position. The rear door assemblies 21L, 21R can each include a door 25 and a rear window panel assembly 28L, 28R, and can be configured to selectively open and close access through the door openings by moving between a closed position and a fully opened position. In the closed position, the door assemblies 20L, 20R, 21L, 21R can span the respective door openings to obstruct access to the passenger area via the door openings.

In the closed position, the front portion of each door assembly 20L, 20R, 21L, 21R can be latched to the roll cage 18. The fully opened position can be any position where the door assemblies 20L, 20R, 21L, 21R are pivoted away from the respective door openings to provide substantially unobstructed access to the passenger area via the door openings. FIG. 1 shows the door assemblies 20L, 20R, 21L, 21R in the closed position. In some embodiments, the door assemblies may include a door without a front window panel assembly. Other embodiments may forego the door assemblies entirely.

Each seat 22L, 22R, 23L, 23R of the vehicle 10 also can include a vehicular seat belt assembly 30, and/or other structures that may be relevant or beneficial.

II. Grille Assembly

Figure 2:
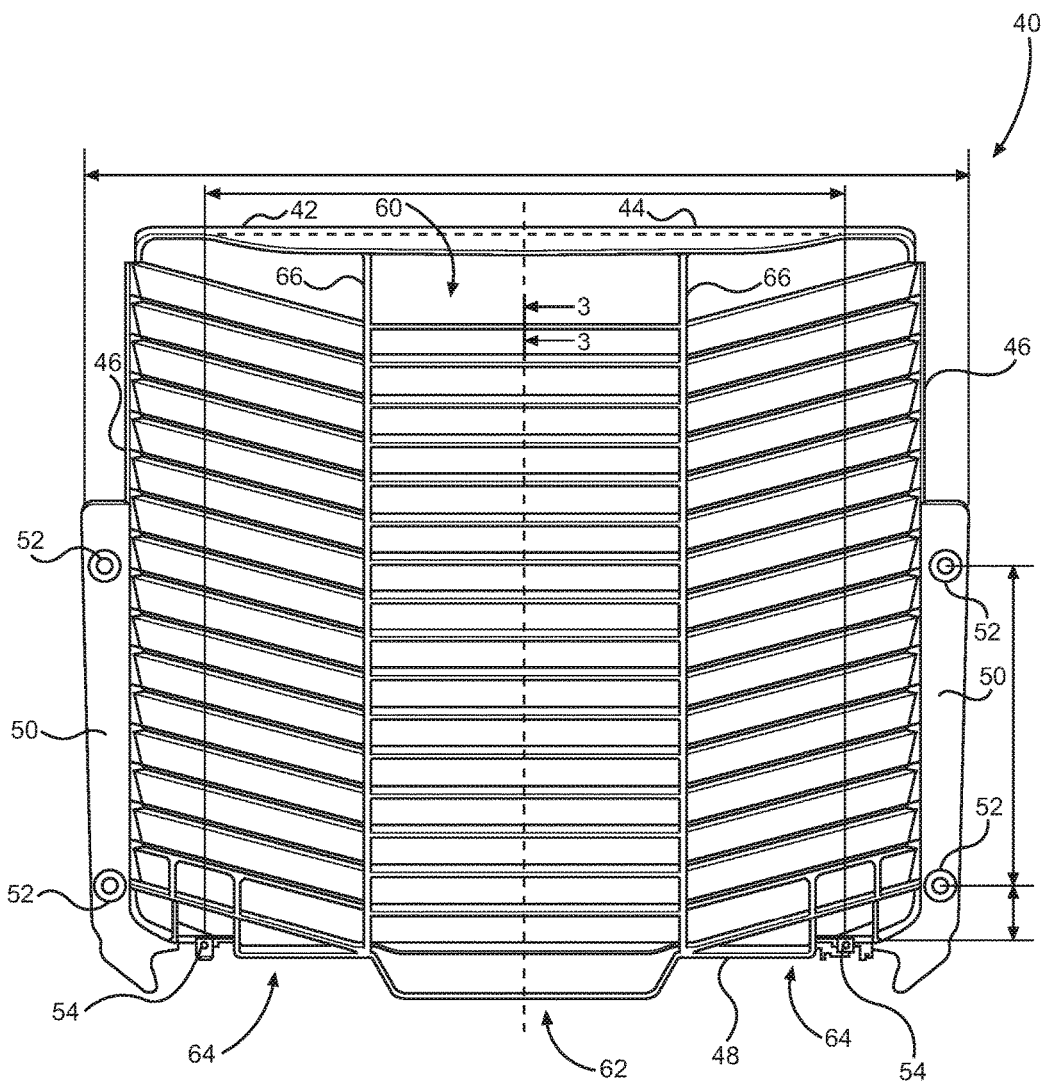
FIG. 2 is perspective view of a front side of a grille assembly of the front assembly, the grille assembly including a plurality of louvers.

FIG. 2 is perspective view of a front side of the grille assembly 40 of the front assembly 13, the grille assembly 40 including a plurality of louvers 60. The grille assembly 40 can be configured as a shroud to cover a forward-facing portion of the radiator that includes air inlets/intakes. The grille assembly 40 can thereby guide air into the air inlets/intakes in the radiator while simultaneously impeding debris from passing into the air inlets/intakes.

FIG. 2 shows an embodiment of the grille assembly 40 including a frame 42 defining an opening through which air can flow to reach the air inlets/intakes in the radiator. The grille assembly 40 can also include a plurality of louvers extending laterally across the opening of the frame 42 to both direct the flow of air into the air inlets/intakes in the radiator as well as block debris from entering the air inlets/intakes and/or damaging the forward-facing portion of the radiator.

The frame 42 of the present embodiment can be substantially rectangular with a top portion 44, side portions 46 and a bottom portion 48 forming a perimeter of the opening. The top portion and side portions 46 of the present embodiment can be substantially planar elongated members, while the bottom portion 48 can have a central portion that protrudes downward so as to be lower than the surrounding side portions thereof. However, other embodiments of the frame 42 can include any suitable configuration of planar and nonplanar top/side/bottom portions. The top portion 44, the side portions 46 and the bottom portion 48 of the frame 42 have a width by which they are configured to extend outward from the forward-facing portion of the radiator. The width of these portions of the frame 42 serves to support ends of the louvers 60 extending therebetween across the opening, as will be described in detail below.

The frame 42 can include a pair of brackets 50 connected to the side portions 46 thereof, the brackets 50 configured for attachment to mounting hardware on the radiator, such as the forward-facing portion of the radiator, and/or surrounding structures. The brackets 50 can each include fasteners 52 for attachment to the mounting hardware to secure the frame 42, and thereby the grille assembly 40, to the front assembly 13 of the vehicle 10. The fasteners 52 can include screws, nuts, bolts, washers, etc. and there may be an upper and a lower fastener 52 for each of the brackets 50. Other embodiments can include more than or less than two of the fasteners 52 for each of the brackets 50, and the fasteners 52 can be disposed at any suitable location of the respective bracket 50. In the present embodiment, the brackets 50 extend substantially along lower parts of the respective side portions 46, however other embodiments may include the brackets 50 extending along any suitable parts of the frame 42. Additionally, other embodiments may include more than or less than a pair of brackets, such as one, three, four, five, etc. Furthermore, alternative attachment structures and means can be provided so as to forego brackets altogether.

The present embodiment of the grille assembly 40 can also include a pair of mounts 54 positioned on the bottom portion 48 of the frame 42. The mounts 54 can be configured for attachment to corresponding mounting hardware on the radiator, such as the forward-facing portion of the radiator, and/or surrounding structures. The mounts 54 can each include fasteners for attachment to the mounting hardware to secure the frame 42, particularly the bottom portion 48, and thereby the grille assembly 40, to the front assembly 13 of the vehicle 10. The fasteners can include screws, nuts, bolts, washers, etc. and there may be a single fastener for each of the mounts 54. Other embodiments can include more than or less than one fastener for each of the mounts 54, and the fasteners can be oriented in any suitable way in relation to the mounts 54. In the present embodiment, the mounts 54 can be configured to be downward-facing, however other embodiments may include the mounts 54 facing any suitable direction relative to the frame 42. Additionally, other embodiments may include more than or less than a pair of mounts, such as one, three, four, five, etc. Furthermore, alternative attachment structures and means can be provided so as to forego mounts altogether.

The louvers 60 of the present embodiment can be formed as elongated members extending laterally across the opening of the frame 42. The louvers 60 can be formed as substantially planar slats extending lengthwise across portions of the opening defined by the frame 42. In the present embodiment, the louvers 60 can be separated by partitions 66 into three approximate groups: those positioned in a central section 62, and those positioned in each of two sides sections 64 surrounding the central section 62. The partitions 66 can be formed as elongated slats extending substantially vertically from the top portion 44 to the bottom portion 48 of the frame 42. In the present embodiment, the partitions 66 can separate the louvers 60 into three substantially similarly sized sections, as described in more detail below. Other embodiments may include greater or fewer number of the partitions 66 extending in any suitable direction across the opening defined by the frame 42, and some embodiments may feature none of the partitions 66 at all.

The louvers 60 can all extend substantially horizontally across the opening defined by the frame 42. Particularly, the louvers 60 in the central section 62 can extend substantially parallel to the top and bottom portions 44, 48 of the frame 42 between the pair of partitions 66. The louvers 60 in the side sections 64 can be angled to extend upward from the respective partition 66 surrounding the central section 62 to the respective side portion 46 of the frame 42. Other embodiments of the louvers 60 can feature those in the central section 62 extending at an angle or perpendicular to the top and bottom portions 44, 48, and those in the side sections 64 can alternatively extend substantially parallel or perpendicular to the top and bottom portions 44, 48 or at varying angles from the partitions 66. The louvers 60 in the central section 62 of the present embodiment may have a greater length than those in the side sections 64, however other embodiments can include configurations in which the louvers 60 in the side sections 64 are greater in length. Still further embodiments may be configured such that all of the louvers 60 are substantially equal in length. As is described below and shown in more detail in FIG. 3, the louvers 60 can each be formed to have a non-linear cross-section.

The louvers 60 in the present embodiment can be configured such that each is aligned, at least at one end, with one of the adjacent louvers 60. For example, each of the louvers 60 in the central section 62 is aligned with adjacent ends of the respective louvers 60 in the side sections 64. This results in an equal number of the louvers 60 in the central section 62 and both of the side sections 64. Due to the configuration of the louvers 60 in the side sections 64 extending upward from the central section 62, a substantially trapezoidal space is formed at an upper area of the opening below the top portion 44. A space shaped substantially similar to that separating each adjacent pair of the louvers 60 in the central section 62 is also formed at a lower area of the opening above the downward protrusion of the bottom portion 48. Other embodiments may include otherwise shaped spaces at the upper and lower areas of the opening defined by the frame 42, and embodiments may also include a varied number of the louvers 60 in each of the central section 62 and side sections 64. The louvers 60 in each of the central and side sections 62, 62 can similarly be oriented so as to not be aligned with at least one end of the adjacent louvers 60.

Figure 3:
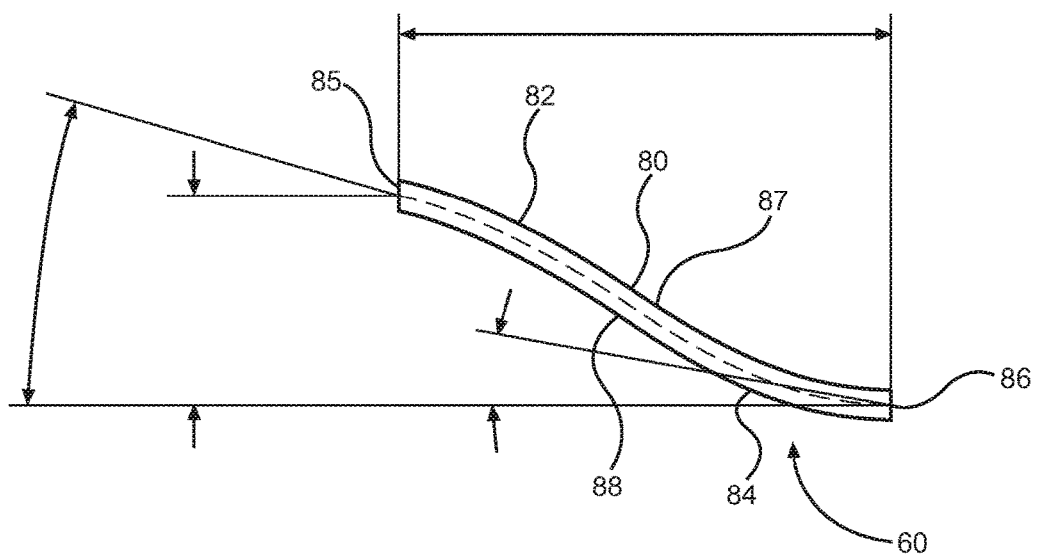
FIG. 3 is a cross-section view of a louver of the grille assembly of FIG. 2.

FIG. 3 is a cross-section view of one of the louvers 60 of the grille assembly 40 of FIG. 2. The louver 60 of the present embodiment that extends laterally across the opening defined by the frame can be configured to have a non-linear cross-section. Specifically, the louver 60 can have a double curve, or wave, shape in profile. The double curve shape of the louver 60 can serve to impede eddie currents and circulation/recirculation of air flowing to the radiator to thereby increase mass flow to the radiator, enhancing radiator efficiency. Structural rigidity of the louver 60 can also be enhanced by virtue of the double curve shape.

The louver 60 of the present embodiment can have a laterally elongated body 80 having a double curve shape defining a first curve portion 82 and second curve portion 84. An exterior of the body 80 can be defined by a front surface 85, a rear surface 86, a top surface 87 and a bottom surface 88. The first and second curve portions 82, 84 can be formed continuously or may be joined by an intermediate portion of the body 80. The first and second curve portions 82, 84 can also have substantially equal or different lengths. For example, the first curve portion 82 can be formed as a greater length portion of the body 80 than the second curve portion 84, or vice versa. In the present embodiment, the second curve portion 84 is configured to terminate at the rear surface 86 to be proximate the forward-facing portion of the radiator when the grille assembly 40 placed over the air inlets/intakes in the radiator, and the first curve portion 82 is configured to terminate at the front surface 85 to be spaced therefrom. In this configuration, the first curve portion 82 is formed forward of the second curve portion 84 such that air flows to the first curve portion 82 before reaching the second curve portion 84 when the vehicle 10 is operated in a forward direction of travel across a surface. However, other embodiments may include a configuration in which the first curve portion 82 is configured to terminate at the rear surface 86 to be proximate the forward-facing portion of the radiator and the second curve portion 84 is configured to terminate at the front surface 85 to be spaced therefrom.

In the present embodiment, the first and second curve portions 82, 84 are formed to curve in opposing directions to form a wave shape. For example, the first curve portion 82 of the present embodiment is formed as a downward-facing curve while the second curve portion 84 is formed as an upward-facing curve. However, depending on an orientation of the louver 60, the first and second curve portions 82, 84 may be facing directions other than upward and downward, permitted the first and second curve portions 82, 84 curve in opposing directions.

In the present embodiment, the first and second curve portions 82, 84 can be formed to each have a different radius of curvature. For example, the first curve portion 82 can have a greater radius of curvature than the second curve portion 84. In one embodiment, a ratio of the radius of the first curve portion 82 to the second curve portion 84 may be in the range of between about 1.25 and 2.0, and more specifically about 1.67. For example, a radius of the first curve portion 82 may be approximately 50 mm, and a radius of the second curve portion 84 may be approximately 30 mm. Alternatively, the second curve portion 84 can have a greater radius of curvature than the first curve portion 82.

In the present embodiment, the body 80 of the louver 60 can be formed to be greater in length than height, with length being defined in forward and backward directions of travel of the vehicle 10. Additionally, length can be defined as substantially a direction of air flow through the grille assembly 40 to the radiator during operation of the vehicle 10, particularly in the forward direction. In some embodiments, the length of the body 80 of the louver 60 can be at least twice the height. Other embodiments can alternatively include the louver 60 configured to have the length of the body 80 as less than twice the height, and in some instances, may even be configured to have the height of the body 80 greater than the length.

In the present embodiment, the terminating end of the first curve portion 82 can extend at a greater angle from parallel than the terminating end of second curve portion 84, as shown in FIG. 3, in which parallel is defined as a plane extending approximately in a direction of airflow entering the grille assembly 40 during operation of the vehicle 10 in the forward direction. For example, the terminating end of the first curve portion 82 can extend at an angle of 16 degrees from parallel while the terminating end of the second curve portion 84 can extend at an angle of 11 degrees from parallel. In other embodiments, the angles of extensions of the terminating ends of the first and second curve portions 82, 84 can be substantially equal. In further embodiments, the terminating end of the second curve portion 84 can extend at a greater angle from parallel than the terminating end of first curve portion 82.

III. Alternative Embodiments

While certain embodiments of the invention are described above, and FIGS. 1-3 disclose the best mode for practicing the various inventive aspects, it should be understood that the invention can be embodied and configured in many different ways without departing from the spirit and scope of the invention.

For example, embodiments are disclosed above in the context of a grille assembly for shrouding air intakes/inlets of a radiator on a vehicle shown in FIG. 1. However, embodiments are intended to include or otherwise cover any type of grille assembly disclosed above. For example, embodiments of the grille assembly disclosed above can be configured to shroud air intakes/inlets as well as exhausts/outlets. In another alternate embodiment, embodiments of the grille assembly can also be configured to shroud vehicle components besides a radiator such as intercoolers, engines, generators, etc. However, the above alternative embodiments are merely provided for exemplary purposes, and as indicated above, embodiments are intended to cover any type of grille assembly disclosed above.

Embodiments are also intended to include or otherwise cover methods of using and methods of manufacturing the grille assembly disclosed above. The methods of manufacturing include or otherwise cover processors and computer programs implemented by processors used to design various elements of the grille assembly disclosed above. For example, embodiments are intended to cover processors and computer programs used to design or manufacture the louvers of the grille assembly that can implement computational fluid dynamics to cause enhanced flow efficiency of air through the louvers to the radiator.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. An air intake grille assembly of a vehicle operable in forward and backward directions of travel across a surface comprising:
    a frame defining an opening; and
    a plurality of louvers extending laterally across the opening, at least one of the plurality of louvers being defined by opposed top and bottom surfaces and having a double curve shape defining first and second curve portions, the top surface terminates at a forward-facing surface and at a backward-facing surface, and the first and second curve portions each have a different radius of curvature, wherein
    the first curve portion defines a single continuous curve shape that terminates at the forward-facing surface of the at least one of the plurality of louvers, and the second curve portion defines a single continuous curve shape that terminates at the backward-facing surface of the at least one of the plurality of louvers,
    the first curve portion extends from the forward-facing surface to the second curve portion, and the second curve portion extends from the backward-facing surface to the first curved portion, and
    the top surface extends along the first curve portion and is convex from the forward-facing surface to the second curve portion, and the top surface extends along the second curve portion and is concave from the backward-facing surface to the first curve portion.

2. The air intake grille assembly of claim 1, wherein the first and second curve portions curve in opposing directions.

3. The air intake grille assembly of claim 2, wherein the at least one of the plurality of louvers has a wave shape.

4. The air intake grille assembly of claim 1, wherein the first curve portion is configured to be forward of the second curve portion such that air flows to the first curve portion before reaching the second curve portion when the vehicle is operated in the forward direction of travel.

5. The air intake grille assembly of claim 4, wherein one of the first curve portion and the second curve portion has a greater radius of curvature than the other.

6. The air intake grille assembly of claim 5, wherein the first curve portion has a greater radius of curvature than that of the second curve portion.

7. The air intake grille assembly of claim 6, wherein a ratio of the radius of curvature of the first curve portion to the radius of curvature of the second curve portion is between 1.25 and 2.

8. The air intake grille assembly of claim 1, wherein the at least one of the plurality of louvers is formed as a unitary structure such that first and second curve portions are continuous.

9. The air intake grille assembly of claim 1, wherein the at least one of the plurality of louvers is greater in length than height, length being defined in the forward and backward directions of travel of the vehicle.

10. The air intake grille assembly of claim 9, wherein the length of the at least one of the plurality of louvers is at least twice the height.

11. A louver of a vehicle grille configured to facilitate air passing therethrough when operated in a forward direction of travel, the louver comprising:
    a laterally elongated body defined by opposed top and bottom surfaces and having a double curve shape defining first and second curve portions, the top surface terminates at a forward-facing surface and at a backward-facing surface, and the first and second curve portions each have a different radius of curvature, wherein
    the first curve portion defines a single continuous curve shape that terminates at the forward-facing surface of the laterally elongated body, and the second curve portion defines a single continuous curve shape that terminates at the backward-facing surface of the laterally elongated body,
    the first curve portion extends from the forward-facing surface to the second curve portion, and the second curve portion extends from the backward-facing surface to the first curved portion, and
    the top surface extends along the first curve portion and is convex from the forward-facing surface to the second curve portion, and the top surface extends along the second curve portion and is concave from the backward-facing surface to the first curve portion.

12. The louver of claim 11, wherein the first and second curve portions curve in opposing directions.

13. The louver of claim 12, wherein the body has a wave shape.

14. The louver of claim 11, wherein the first curve portion is configured to be forward of the second curve portion such that air passing through the vehicle grille flows to the first curve portion before reaching the second curve portion.

15. The louver of claim 14, wherein one of the first curve portion and the second curve portion has a greater radius of curvature than the other.

16. The louver of claim 15, wherein the first curve portion has a greater radius of curvature than that of the second curve portion.

17. The louver of claim 11, wherein the body is formed as a unitary structure such that first and second curve portions are continuous.

18. The louver of claim 11, wherein the body is greater in length than height, length being defined in a direction that air passes through the vehicle grille.

19. The louver of claim 18, wherein the length of the louver is at least twice the height.

20. A vehicle having a front assembly configured to direct air flow to a radiator, the vehicle comprising:
    a grille frame connected to the front assembly proximate the radiator, the grille frame defining an opening, and;
    a plurality of louvers extending laterally across the opening, at least one of the plurality of louvers being defined by opposed top and bottom surfaces and having a double curve shape defining first and second curve portions, the top surface terminates at a front-facing surface and at a rear-facing surface, and the first and second curve portions each have a different radius of curvature, wherein
    the first curve portion defines a single continuous curve shape that terminates at the front-facing surface of the at least one of the plurality of louvers, and the second curve portion defines a single continuous curve shape that terminates at the rear-facing surface of the at least one of the plurality of louvers, the first curve portion extends from the front-facing surface to the second curve portion, and the second curve portion extends from the rear-facing surface to the first curved portion, and the top surface extends along the first curve portion and is convex from the front-facing surface to the second curve portion, and the top surface extends along the second curve portion and is concave from the rear-facing surface to the first curve portion.

\* \* \* \* \*